United States Patent
Camci et al.

(10) Patent No.: US 12,000,330 B1
(45) Date of Patent: Jun. 4, 2024

(54) PUSH-TO-CONNECT CRANK AND LINKAGE ASSEMBLY FOR A TURBOCHARGER, AND ASSOCIATED ASSEMBLY METHOD

(71) Applicant: Garrett Transportation I Inc., Torrance, CA (US)

(72) Inventors: Talha Camci, Brno (CZ); Karel Mizerovsky, Brno (CZ); Lukas Novotny, Brno (CZ)

(73) Assignee: GARRETT TRANSPORTATION I INC., Torrance, CA (US)

( * ) Notice: Subject to any disclaimer, the term of this patent is extended or adjusted under 35 U.S.C. 154(b) by 0 days.

(21) Appl. No.: 18/163,894

(22) Filed: Feb. 3, 2023

(51) Int. Cl.
| | | |
|---|---|---|
| *F01D 17/10* | (2006.01) | |
| *F01D 17/12* | (2006.01) | |
| *F02B 37/12* | (2006.01) | |
| *F02B 37/18* | (2006.01) | |

(52) U.S. Cl.
CPC ............ *F02B 37/12* (2013.01); *F01D 17/105* (2013.01); *F01D 17/12* (2013.01); *F02B 37/183* (2013.01); *F02B 37/186* (2013.01); *F05D 2220/40* (2013.01); *F05D 2260/50* (2013.01); *F05D 2260/57* (2013.01)

(58) Field of Classification Search
CPC .... F02B 37/186; F02B 37/183; F01D 17/105; F01D 17/10; F01D 17/12; F01D 17/145; F01D 17/16; F01D 17/165; F16B 21/07; F16B 21/073; Y10T 403/32951; Y10T 403/32959; F16C 7/02; F16C 7/023
See application file for complete search history.

(56) References Cited

U.S. PATENT DOCUMENTS

| | | | |
|---|---|---|---|
| 6,116,807 A | 9/2000 | Dzurko et al. | |
| 6,895,947 B2 * | 5/2005 | Allmang | F01D 17/165 |
| | | | 123/559.3 |
| 7,559,714 B2 * | 7/2009 | Ruhlander | F16C 1/14 |
| | | | 403/361 |
| 10,533,491 B1 * | 1/2020 | Milburn | F02B 37/186 |
| 10,605,115 B2 * | 3/2020 | Iwata | F16K 1/2035 |
| 10,605,157 B2 * | 3/2020 | Sadamitsu | F01D 17/105 |
| 10,787,957 B2 * | 9/2020 | Nakajima | F02B 37/186 |
| 10,808,605 B2 * | 10/2020 | Paulov | F02B 37/186 |
| 10,914,189 B2 * | 2/2021 | Nakamura | F01D 17/105 |
| 11,098,658 B2 * | 8/2021 | Yanagida | F02B 39/00 |

(Continued)

FOREIGN PATENT DOCUMENTS

WO     2013022598 A1     2/2013

*Primary Examiner* — Justin D Seabe
*Assistant Examiner* — Behnoush Haghighian
(74) *Attorney, Agent, or Firm* — BelayIP (57) ABSTRACT

A crank and linkage assembly for a component of a turbocharger includes a linkage and two cranks each including a pin whose outer surface defines a pin groove. Each end of the linkage defines a through bore for receiving one of the pins. At each end of the linkage, a plurality of fingers are integrally formed and of one piece with the linkage, the fingers extending parallel to, and circumferentially spaced about, the through bore axis. The fingers are elastically bendable such that the hooks move away from the bore axis and such that a restoring force of each of the fingers acts in a direction to bend the hooks back toward the bore axis. The assembly can be assembled by a push-to-connect process in which each pin is advanced into the respective through bore until the hooks snap into the respective pin groove.

5 Claims, 6 Drawing Sheets

(56) References Cited

U.S. PATENT DOCUMENTS

| | | |
|---|---|---|
| 11,352,945 B1 | 6/2022 | Wang et al. |
| 11,585,233 B2 * | 2/2023 | Helisch ............... F16C 11/0652 |
| 2004/0055297 A1 * | 3/2004 | Allmang ............... F01D 17/165 |
| | | 60/602 |
| 2014/0366530 A1 * | 12/2014 | Murayama ............ F02B 37/183 |
| | | 60/602 |
| 2018/0223727 A1 * | 8/2018 | Nakajima ............. F02B 37/186 |
| 2018/0230847 A1 * | 8/2018 | Nakamura ............ F01D 17/105 |
| 2018/0230848 A1 * | 8/2018 | Iwata .................... F02B 37/183 |
| 2018/0266310 A1 * | 9/2018 | Sadamitsu ................ F16K 1/20 |
| 2019/0211752 A1 * | 7/2019 | Yanagida .................. F02C 9/18 |
| 2021/0388734 A1 * | 12/2021 | Helisch ............... F16C 11/0652 |

\* cited by examiner

PUSH-TO-CONNECT CRANK AND LINKAGE ASSEMBLY FOR A TURBOCHARGER, AND ASSOCIATED ASSEMBLY METHOD

BACKGROUND OF THE INVENTION

This application relates generally to turbochargers for internal combustion engines, and relates more particularly to a crank and linkage assembly for connecting between an actuator and an adjustable component such as a waste gate valve, a variable nozzle for the turbine, or the like.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas, which is then discharged into an exhaust conduit that may be connected to further treatment devices such as a catalytic device and/or sound-attenuating muffler. The turbine thus extracts power from the exhaust gas and drives the compressor. The compressor receives ambient air through an inlet of the compressor housing and the air is compressed by the compressor wheel and is then discharged from the housing to the engine air intake.

The turbine of the turbocharger often includes a variable-geometry component such as a waste gate valve (often called a waste gate) or a variable-vane assembly for the turbine nozzle. In the case of the waste gate valve, it is arranged in the turbine housing in a location such that opening the valve causes the majority of exhaust gases coming from the engine to bypass the turbine wheel and proceed directly into the exhaust conduit. The waste gate valve enables the power-extraction of the turbine to be controlled, thereby controlling the amount of boost provided by the compressor. Thus, the waste gate valve can be either closed, partially opened to various degrees, or fully open, depending upon the operating condition of the engine and the amount of boost desired from the turbocharger.

In the case of a variable nozzle for the turbine, typically an array of pivotable vanes is supported on a nozzle ring and the vanes are actuated to pivot by the rotation of a unison ring, which in turn is caused to rotate by actuator arrangement.

Such variable-geometry components are typically actuated by a rotary actuator whose output shaft is connected to a crank. The actuator crank is rotatably coupled to one end of a linkage, and the opposite end of the linkage is rotatably coupled to a crank affixed to a movable member of the variable-geometry component. The coupling of the ends of the linkage to the cranks is usually accomplished by a pin and retaining clip arrangement. Thus, each crank has a pin projecting therefrom, and the outer surface of the pin near the distal end thereof defines a circular groove encircling the pin. The linkage defines a through-bore that receives the pin. A generally C-shaped or E-shaped retaining clip (often called a circlip or e-ring) is snapped into the circular groove to capture the linkage and prevent it from being removed from the pin.

There are drawbacks to this conventional linkage and crank assembly, such as the increased cost associated with the use of the retaining rings. Another issue is that unless additional components such as a wave spring are added to the assembly, the linkage is subject to excessive play in the direction parallel to the axis of the pin. A wave spring or the like can reduce the play, but this solution comes with even further cost and parts count. The retaining rings can also be subject to stress corrosion cracking, which can cause the rings to break and compromise the integrity of the linkage-to-crank connection. Moreover, there is the danger that the retaining rings may become misplaced, which can lead to the linkage becoming detached from one or both of the pins during turbocharger operation.

SUMMARY OF THE DISCLOSURE

The present disclosure describes a crank and linkage assembly for a turbocharger that can mitigate or eliminate the drawbacks noted above, and achieve further advantages noted herein. In particular, the disclosed assembly can simplify the manufacturing and assembly process by reducing parts count and facilitating a push-to-connect process between the linkage and the pin of the crank.

In accordance with one embodiment disclosed herein, a turbocharger has an actuator assembly including a crank and linkage assembly comprising:

a first crank having a cylindrical first pin extending therefrom along a first pin axis and terminating at a distal end of the first pin, an outer surface of the first pin defining a circular first pin groove therein encircling the first pin axis, the first pin groove being spaced along the first pin axis from the first crank;

a linkage comprising an elongate member extending from a first end to a second end, the linkage defining a first through bore adjacent the first end, the first through bore extending along a first bore axis; and a plurality of first fingers integrally formed and of one piece with the first end of the linkage, the first fingers extending parallel to, and circumferentially spaced about, the first bore axis, each of the first fingers joining with the linkage at a root end of the first finger and having an opposite distal end, the distal ends of the first fingers defining hooks that project inwardly toward the first bore axis, the first fingers being elastically bendable such that the hooks move away from the first bore axis and such that a restoring force of each of the first fingers acts in a direction to bend the hooks back toward the first bore axis;

the first pin being received into the first through bore, the hooks of the first fingers being engaged in the first pin groove so as to resist withdrawal of the first pin from the first through bore, thereby forming a connection between the first crank and the linkage.

The crank and linkage assembly can further comprise a second crank having a cylindrical second pin extending therefrom along a second pin axis and terminating at a distal end of the second pin, an outer surface of the second pin defining a circular second pin groove therein encircling the second pin axis, the second pin groove being spaced along the second pin axis from the second crank. The linkage defines a second through bore adjacent the second end, the second through bore extending along a second bore axis that is parallel to the first bore axis. A plurality of second fingers are integrally formed and of one piece with the second end of the linkage, the second fingers extending parallel to, and circumferentially spaced about, the second bore axis, each of the second fingers joining with the linkage at a root end of the second finger and having an opposite distal end, the distal ends of the second fingers defining hooks that project inwardly toward the second bore axis, the second fingers being elastically bendable such that the hooks move away from the second bore axis and such that a restoring force of each of the second fingers acts in a direction to bend the hooks back toward the second bore axis. The second pin is received into the second through bore, the hooks of the second fingers being engaged in the second pin groove so as to resist withdrawal of the second pin from the second through bore, thereby forming a connection between the second crank and the linkage.

In one embodiment, the distal ends of the first and second pins each defines a taper for engagement with the hooks of the first/second fingers as the first/second pin is advanced into the first/second through bore. The taper forces the hooks outwardly away from the bore axis and, with further advancement of the respective pin into the respective through bore, the hooks become aligned with the respective pin groove and the restoring forces of the fingers cause the hooks to move inwardly to snap into the respective pin groove.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
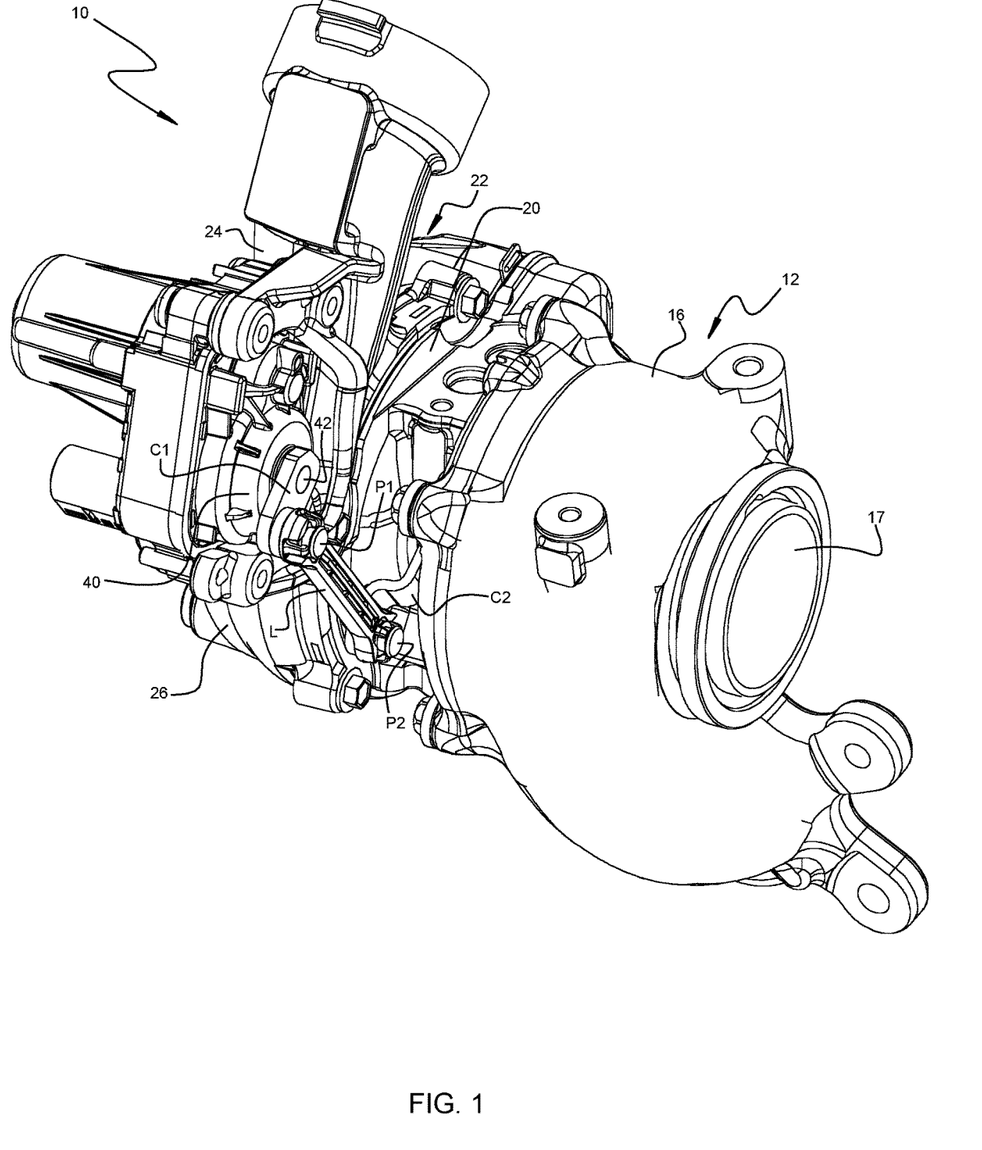
FIG. 1 is an isometric view of a turbocharger in accordance with an embodiment of the invention.
Figure 2:
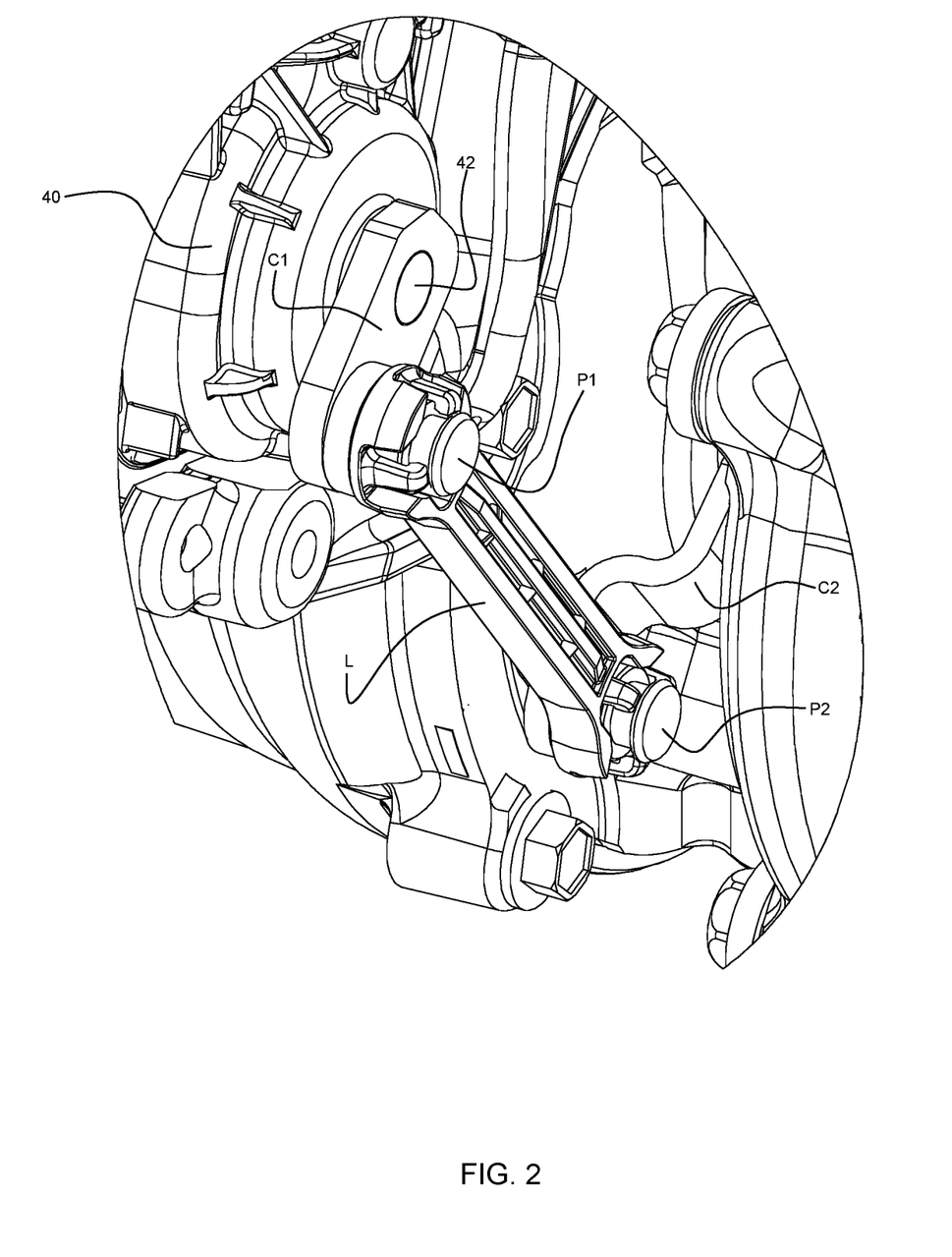
FIG. 2 is a magnified portion of FIG. 1.

FIGS. 1 and 2 illustrate a turbocharger 10 in accordance with an embodiment of the invention. The turbocharger comprises a compressor 12 having a compressor wheel (not visible) mounted within a compressor housing 16 defining an air inlet 17 for the compressor, and a turbine 22 comprising a turbine wheel (not visible) mounted within a turbine housing 24 and connected to a shaft (not visible) that also connects with the compressor wheel. A center housing 20 is disposed between and secured to the compressor housing and turbine housing, and contains bearings for the shaft.

The turbine housing 24 defines an annular chamber 26 surrounding the turbine wheel 25 for receiving exhaust gas from an internal combustion engine (not shown). Exhaust gas is directed from the chamber via a turbine nozzle (not visible) onto the turbine wheel. In some operating conditions, it may be desirable to cause some of the exhaust gas to bypass the turbine wheel and proceed directly into the downstream exhaust conduit, and to this end, turbochargers typically include a waste gate valve (not visible) arranged in a bypass passage defined by the turbine housing. The bypass passage connects between the chamber 26 and the discharge bore of the turbine housing downstream of the turbine wheel. Thus, when the waste gate valve is opened, some of the exhaust gas passes through the valve and thereby bypasses the turbine wheel.

Additionally, some turbochargers include a variable nozzle for the turbine so that exhaust gas flow into the turbine wheel can be regulated via adjustment of the variable nozzle. For example, the nozzle often includes an array of vanes that are pivotally mounted to a nozzle ring and can be actuated to pivot by rotation of a unison ring.

When a turbocharger includes such a variable-geometry member (i.e., a waste gate valve or a variable vane assembly), it is necessary to provide an actuator assembly that includes a rotary actuator connected to the variable member via a kinematic chain. Thus, with reference to FIGS. 1 and 2, in the illustrated embodiment, the turbocharger includes a variable vane assembly (not visible). Actuation of the unison ring for the variable vane assembly is accomplished by an actuator 40 connected to the unison ring via a kinematic linkage arrangement comprising a first crank C1, a linkage L, and a second crank C2. The actuator 40 has a rotary output shaft 42, and one end of the first crank C1 is rigidly affixed to the output shaft. A first end of the linkage L is rotatably coupled to the first crank C1, and the opposite second end of the linkage is rotatably coupled to one end of the second crank C2. An internal pivotable arm (not visible) coupled with the unison ring has a rotary shaft, and an opposite end of the second crank C2 is rigidly affixed to that shaft. Thus, rotation of the output shaft 42 of the actuator causes the first crank C1 to pivot, which moves the linkage L so as to cause the second crank C2 to pivot and thereby actuate the unison ring.

With reference to FIGS. 2 through 6C, the first crank includes a first pin P1 mounted adjacent an opposite end of the crank from the end affixed to the actuator shaft 42. The corresponding end of the linkage L defines a through bore B1 that receives the pin P1, and the linkage has features that captively connect the linkage to the pin in a manner described below. Similarly, the other end of the linkage defines a through bore B2 that receives the second pin P2 of the second crank C2, and similar features connect the linkage to the second pin.

Figure 3:
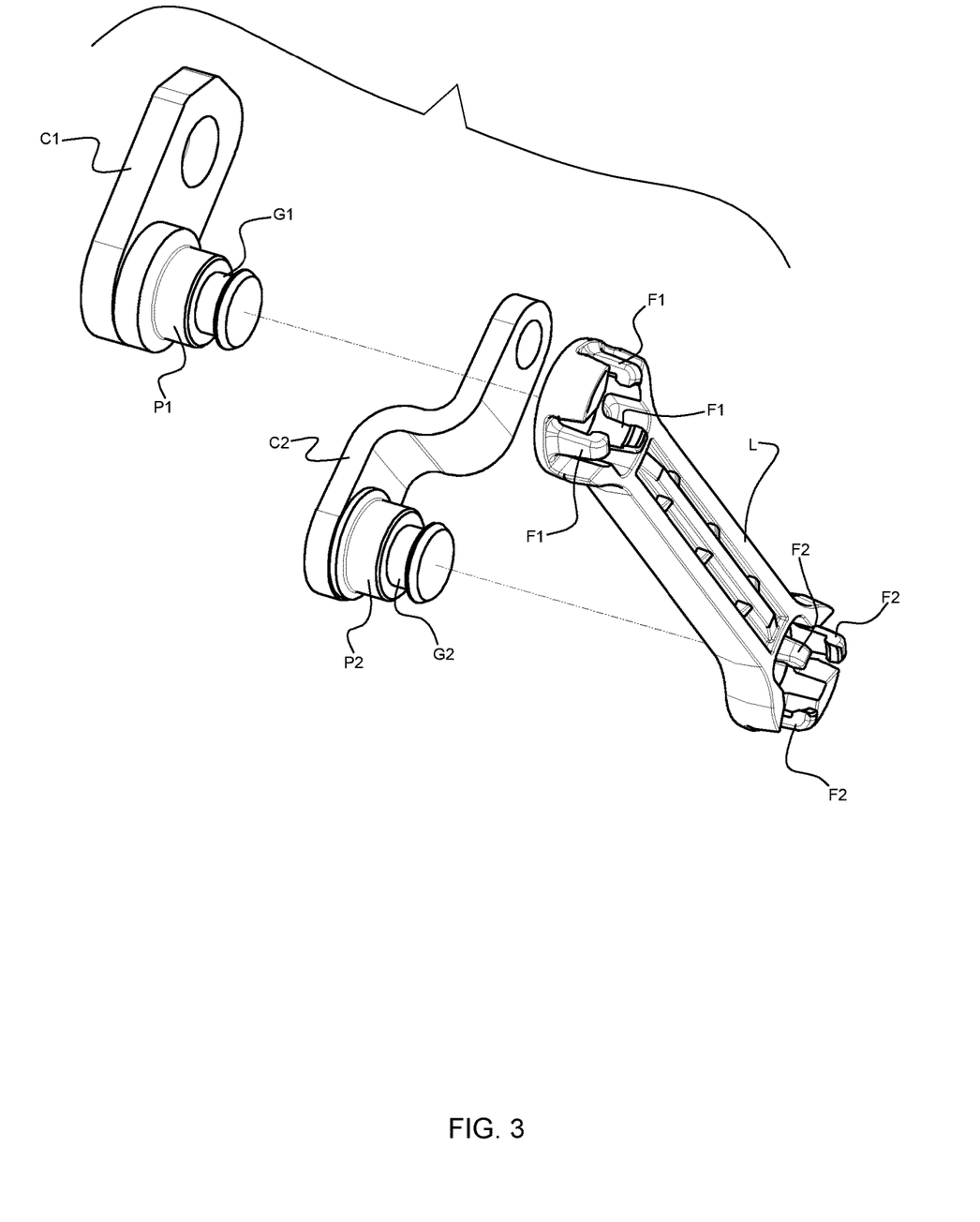
FIG. 3 is an exploded view of a crank and linkage assembly for the turbocharger in accordance with one embodiment of the invention.

Referring particularly to FIG. 3, the first pin P1 defines a first pin groove G1 encircling the generally cylindrical pin. The first pin groove is spaced from the proximal end of the pin along the direction of the first pin axis. The distal end of the first pin defines a taper or chamfer, the function of which is described below. Similarly, the second pin P2 defines a second pin groove G2 and a taper or chamfer.

Figure 4A:
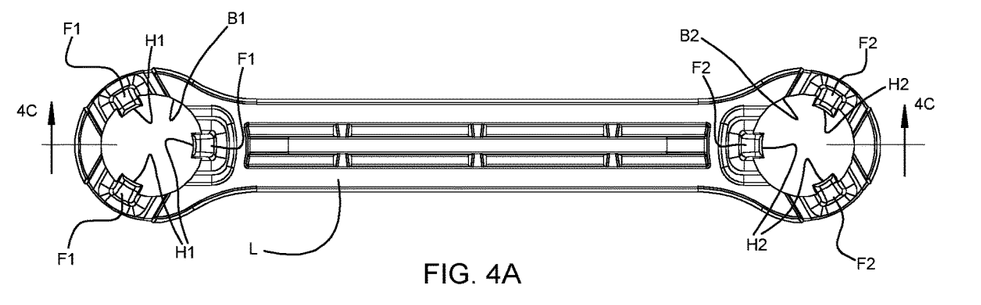
FIG. 4A is a top view of a linkage in accordance with one embodiment of the invention.
Figure 4B:
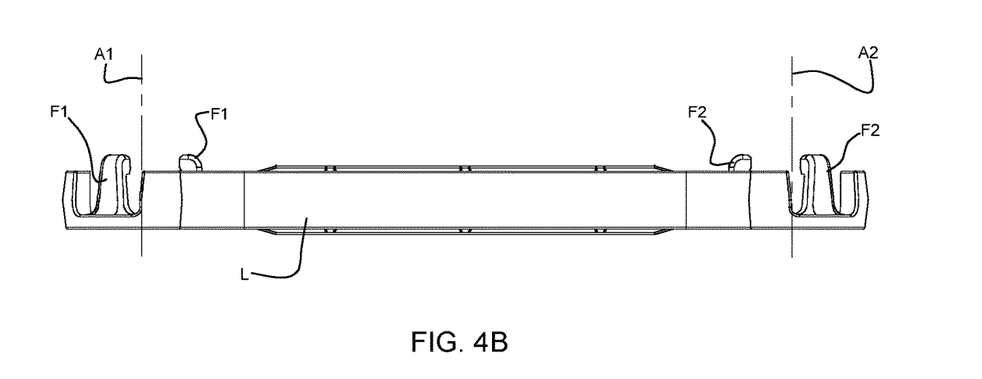
FIG. 4B is a side view of the linkage of FIG. 4A.
Figure 4C:
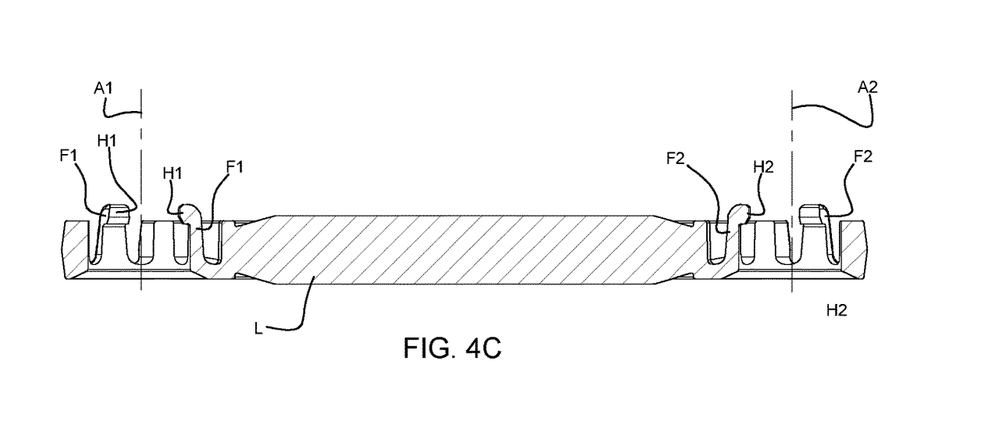
FIG. 4C is a cross-sectional view along line 4C-4C in FIG. 4A.

With reference to FIGS. 4A-4C, the linkage L comprises an elongate rod or bar having opposite first and second ends that respectively define the first bore B1 and the second bore B2. Surrounding the axis A1 of the first bore B1 is a plurality of first fingers F1 that are integrally formed with and of one piece with the rest of the linkage. The fingers are circumferentially spaced about the bore axis A1 and extend parallel thereto, terminating in distal ends, each distal end defining a hook H1 that extends radially inwardly toward the bore axis. The first fingers are elastically deformable in bending so that the hooks can be spread apart (increasing their distance from the bore axis), and a restoring force of each finger acts in a direction to move the hook back toward the bore axis.

Similarly, at the second end of the linkage there is a plurality of second fingers F2 surrounding the axis A2 of the second bore B2, the second fingers being integrally formed with and of one piece with the rest of the linkage. The fingers are circumferentially spaced about the bore axis A2 and extend parallel thereto, terminating in distal ends, each distal end defining a hook H2 that extends radially inwardly toward the bore axis. The second fingers are similarly bendable in an elastic manner.

Figure 5:
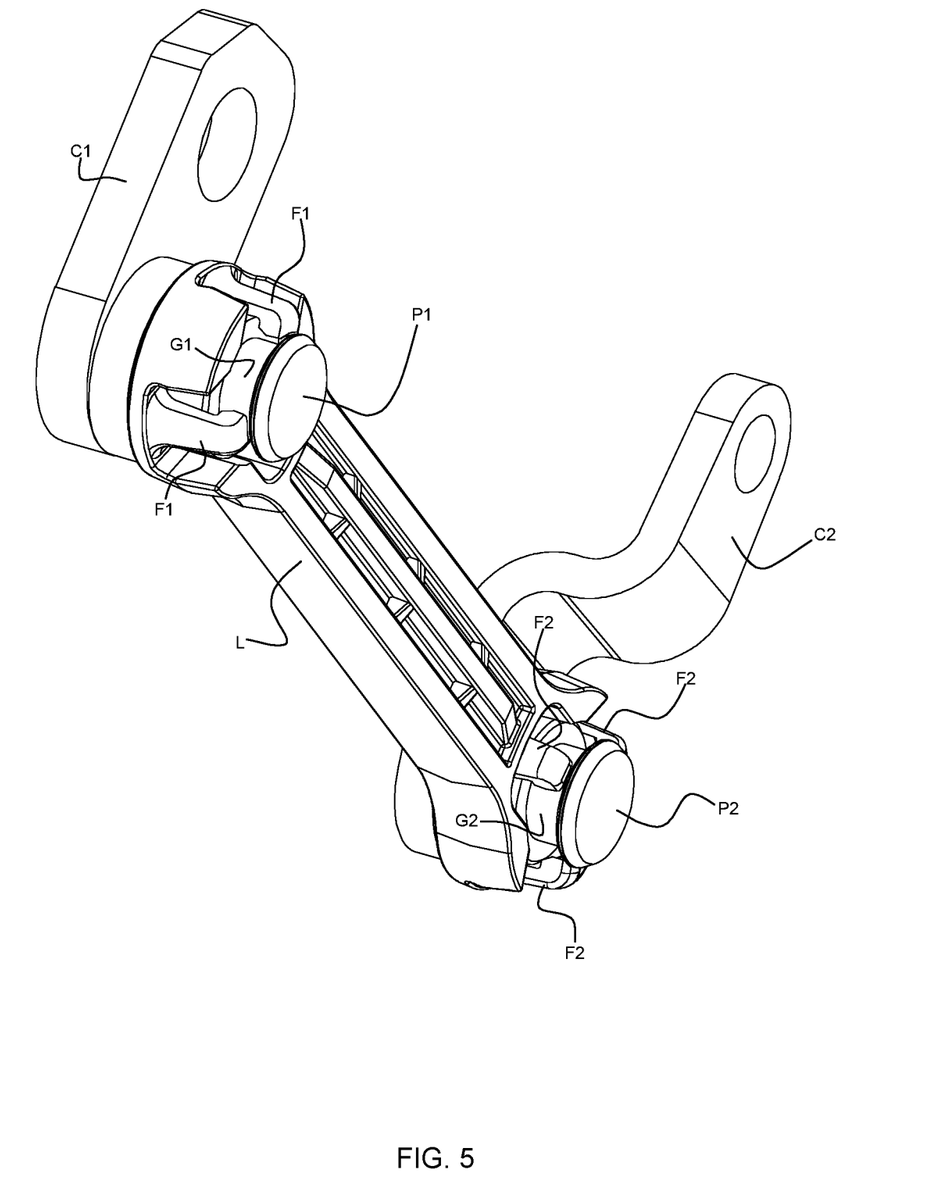
FIG. 5 is an isometric view of the assembled crank and linkage assembly of FIG. 3 in accordance with one embodiment of the invention.
Figure 6A:
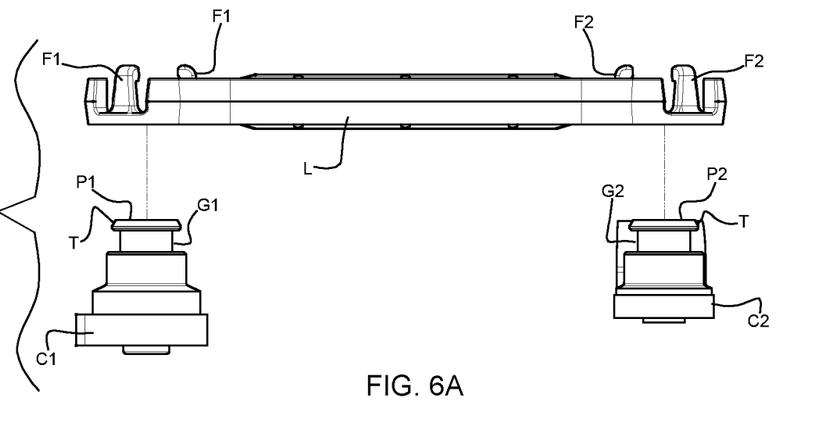
FIG. 6A is an exploded side view of the crank and linkage assembly prior to connection of the linkage to the cranks.
Figure 6B:
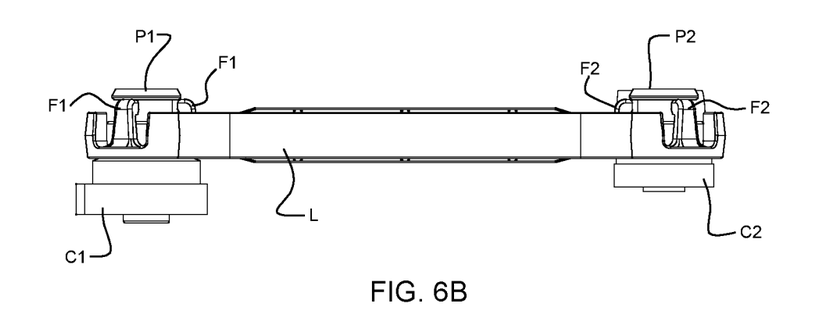
FIG. 6B is a side view of the assembly after connection of the linkage to the cranks.
Figure 6C:
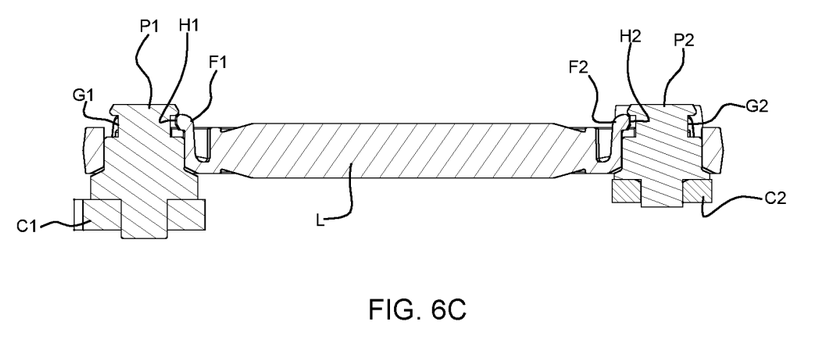
FIG. 6C is a cross-sectional view through the crank and linkage assembly.

The first and second fingers of the linkage are configured so that the hooks can engage in the pin grooves of the respective pins when the pins are inserted into the respective bores of the linkage, as best seen in FIGS. 5-6C. FIG. 6A shows the crank and linkage assembly before the cranks are coupled with the linkage. As noted, the distal ends of the pins P1 and P2 have a taper or chamfer T, the purpose of which is to engage the hooks H1 and H2 of the respective fingers F1 and F2 and push them radially outwardly as the pins are advanced into the bores B1 and B2, respectively. With further advancement of the pins, the hooks become aligned with the pin grooves G1 and G2, and the restoring forces of the fingers cause the hooks to move radially inwardly into the pin grooves, snapping into place below the distal portions of the pins so as to prevent the pins from being withdrawn from the bores, as best seen in FIGS. 5, 6B, and 6C. The assembly thus comprises a push-to-connect assembly that enables the linkage to be connected to the pins of the cranks without requiring any tool or any additional parts such as retaining rings or the like. The fingers of the linkage capture the pins while allowing relative rotation between the pins and the linkage during operation.

The linkage L in accordance with embodiments of the invention can be formed by a suitable process such as injection molding. Various thermoplastic materials can be suitable for molding the linkage, one non-limiting example of which is a fiber-reinforced plastic such as KetaSpire® KT-820, which is a 20% chopped carbon fiber-reinforced polyetheretherketone (PEEK). The material should provide sufficient elasticity for the fingers to allow them to be deformed outwardly upon insertion of the pins and to return toward their relaxed positions once the hooks of the fingers snap into the pin grooves.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A crank and linkage assembly for a turbocharger, comprising:

a first crank having a cylindrical first pin extending therefrom along a first pin axis and terminating at a distal end of the first pin, an outer surface of the first pin defining a circular first pin groove therein encircling the first pin axis, the first pin groove being spaced along the first pin axis from the first crank;

a linkage comprising an elongate member extending from a first end to a second end, the linkage defining a first through bore adjacent the first end, the first through bore extending along a first bore axis; and a plurality of first fingers integrally formed and of one piece with the first end of the linkage, the first fingers extending parallel to, and circumferentially spaced about, the first bore axis, each of the first fingers joining with the linkage at a root end of the first fingers and having an opposite distal end, the distal ends of the first fingers defining hooks that project inwardly toward the first bore axis, the first fingers being elastically bendable such that the hooks move away from the first bore axis and such that a restoring force of each of the first fingers acts in a direction to bend the hooks back toward the first bore axis;

the first pin being received into the first through bore, the hooks of the first fingers being engaged in the first pin groove so as to resist withdrawal of the first pin from the first through bore, wherein the distal end of the first pin defines a taper for engagement with the hooks of the first fingers as the first pin is advanced into the first through bore, thereby forming a connection between the first crank and the linkage in which the first fingers extend from the root end to the distal ends in a direction away from the first crank and toward the distal end of the first pin.

2. The crank and linkage assembly for a turbocharger of claim 1, further comprising a second crank having a cylindrical second pin extending therefrom along a second pin axis and terminating at a distal end of the second pin, an outer surface of the second pin defining a circular second pin groove therein encircling the second pin axis, the second pin groove being spaced along the second pin axis from the second crank, the linkage defining a second through bore adjacent the second end, the second through bore extending along a second bore axis that is parallel to the first bore axis; and a plurality of second fingers integrally formed and of one piece with the second end of the linkage, the second fingers extending parallel to, and circumferentially spaced about, the second bore axis, each of the second fingers joining with the linkage at a root end of the second finger and having an opposite distal end, the distal ends of the second fingers defining hooks that project inwardly toward the second bore axis, the second fingers being elastically bendable such that the hooks move away from the second bore axis and such that a restoring force of each of the second fingers acts in a direction to bend the hooks back toward the second bore axis;

the second pin being received into the second through bore, the hooks of the second fingers being engaged in the second pin groove so as to resist withdrawal of the second pin from the second through bore, thereby forming a connection between the second crank and the linkage.

3. A turbocharger having an actuator assembly including a crank and linkage assembly comprising:

a first crank having a cylindrical first pin extending therefrom along a first pin axis and terminating at a distal end of the first pin, an outer surface of the first pin defining a circular first pin groove therein encircling the first pin axis, the first pin groove being spaced along the first pin axis from the first crank;

a linkage comprising an elongate member extending from a first end to a second end, the linkage defining a first through bore adjacent the first end, the first through bore extending along a first bore axis; and a plurality of first fingers integrally formed and of one piece with the first end of the linkage, the first fingers extending parallel to, and circumferentially spaced about, the first bore axis, each of the first fingers joining with the linkage at a root end of the first fingers and having an opposite distal end, the distal ends of the first fingers defining hooks that project inwardly toward the first bore axis, the first fingers being elastically bendable such that the hooks move away from the first bore axis and such that a restoring force of each of the first fingers acts in a direction to bend the hooks back toward the first bore axis;

the first pin being received into the first through bore, the hooks of the first fingers being engaged in the first pin groove so as to resist withdrawal of the first pin from the first through bore, wherein the distal end of the first pin defines a taper for engagement with the hooks of the first fingers as the first pin is advanced into the first through bore, thereby forming a connection between the first crank and the linkage in which the first fingers extend from the root end to the distal ends in a direction away from the first crank and toward the distal end of the first pin.

4. The turbocharger of claim 3, the crank and linkage assembly further comprising a second crank having a cylindrical second pin extending therefrom along a second pin axis and terminating at a distal end of the second pin, an outer surface of the second pin defining a circular second pin groove therein encircling the second pin axis, the second pin groove being spaced along the second pin axis from the second crank, the linkage defining a second through bore adjacent the second end, the second through bore extending along a second bore axis that is parallel to the first bore axis; and a plurality of second fingers integrally formed and of one piece with the second end of the linkage, the second fingers extending parallel to, and circumferentially spaced about, the second bore axis, each of the second fingers joining with the linkage at a root end of the second finger and having an opposite distal end, the distal ends of the second fingers defining hooks that project inwardly toward the second bore axis, the second fingers being elastically bendable such that the hooks move away from the second bore axis and such that a restoring force of each of the second fingers acts in a direction to bend the hooks back toward the second bore axis;

the second pin being received into the second through bore, the hooks of the second fingers being engaged in the second pin groove so as to resist withdrawal of the second pin from the second through bore, thereby forming a connection between the second crank and the linkage.

5. The turbocharger of claim 4, wherein the distal end of the second pin defines a taper for engagement with the hooks of the second fingers as the second pin is advanced into the second through bore.

\* \* \* \* \*